United States Patent [19]

Johnson et al.

[11] 3,967,559

[45] July 6, 1976

[54] APPARATUS FOR REMOVING MAGAZINES FROM A CLOSED LOOP OF CONTINUOUSLY INDEXED MAGAZINES AND REINSERTING THE MAGAZINES INTO THE LOOP

[75] Inventors: Charles H. Johnson; Edward A. Wallace, both of Madison, Wis.

[73] Assignee: Oscar Mayer & Co. Inc., Madison, Wis.

[22] Filed: Mar. 11, 1975

[21] Appl. No.: 557,257

[52] U.S. Cl. .................................. 104/88; 198/85
[51] Int. Cl.² .......................................... B61J 3/00
[58] Field of Search ............... 198/19, 20 R, 38, 85; 214/11 R, 16.4 C; 104/88, 96, 97, 127; 425/447, 449, 453, 454; 99/443 C; 187/97

[56] References Cited
UNITED STATES PATENTS

| 1,774,233 | 8/1930 | Hassler | 104/96 |
| 2,823,811 | 2/1958 | Temple | 198/85 |

FOREIGN PATENTS OR APPLICATIONS

| 438,823 | 8/1948 | Italy | 187/97 |

Primary Examiner—Evon C. Blunk
Assistant Examiner—Joseph E. Valenza
Attorney, Agent, or Firm—Lockwood, Dewey, Zickert & Alex

[57] ABSTRACT

An apparatus associated with a closed loop of indexing magazines, including a bottom transfer means for transferring a magazine from the closed loop outside of the closed loop to a work station, a center transfer means for transferring a magazine from the work station to an elevator which moves the magazine to a given point in the closed loop and a top transfer means for transferring the magazine from the elevator into the closed loop. A further elevator is provided in the closed loop for bypassing the work station outside the closed loop in the event that no magazine is being transferred from the work station to the elevator for reinsertion into the closed loop.

19 Claims, 19 Drawing Figures

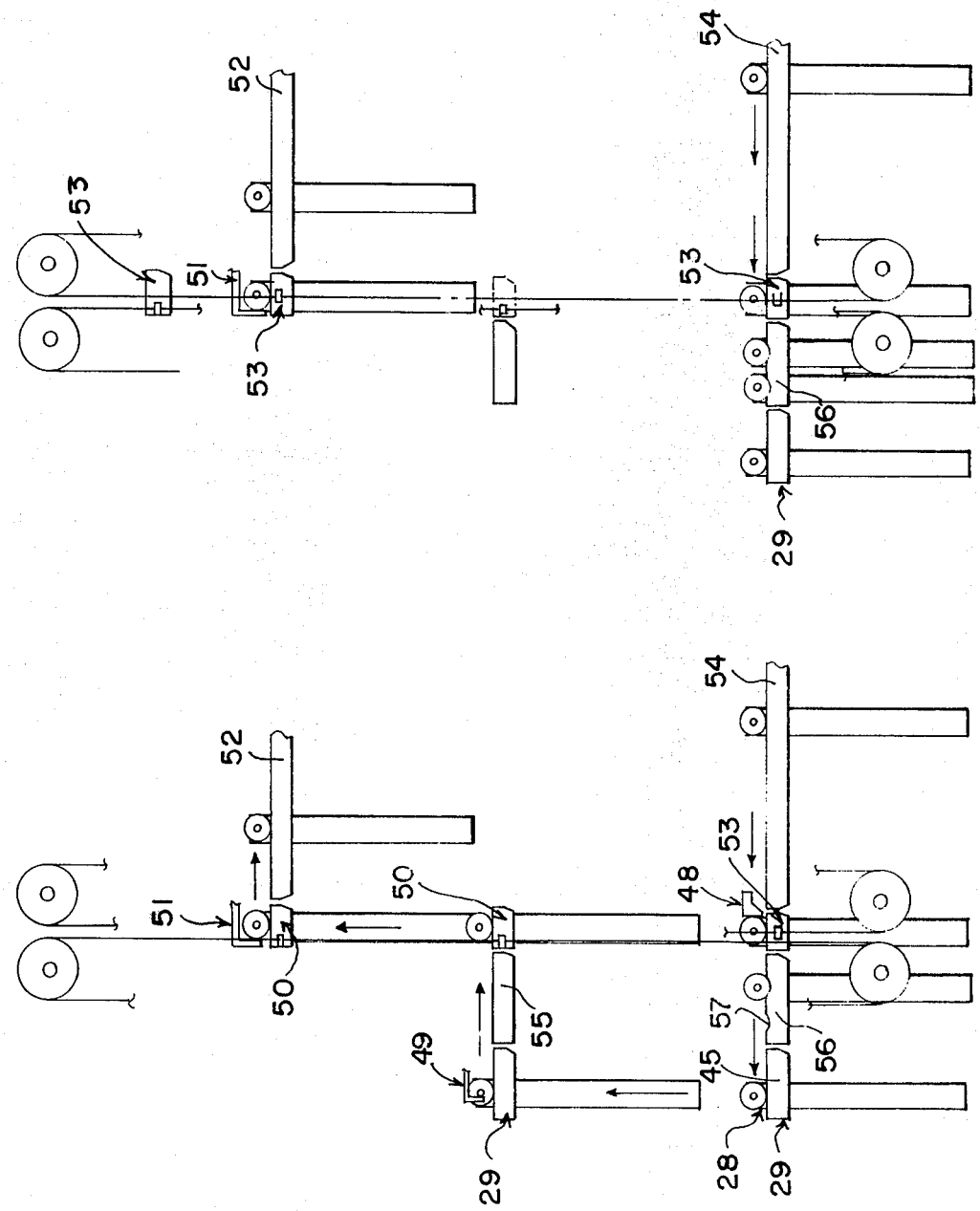

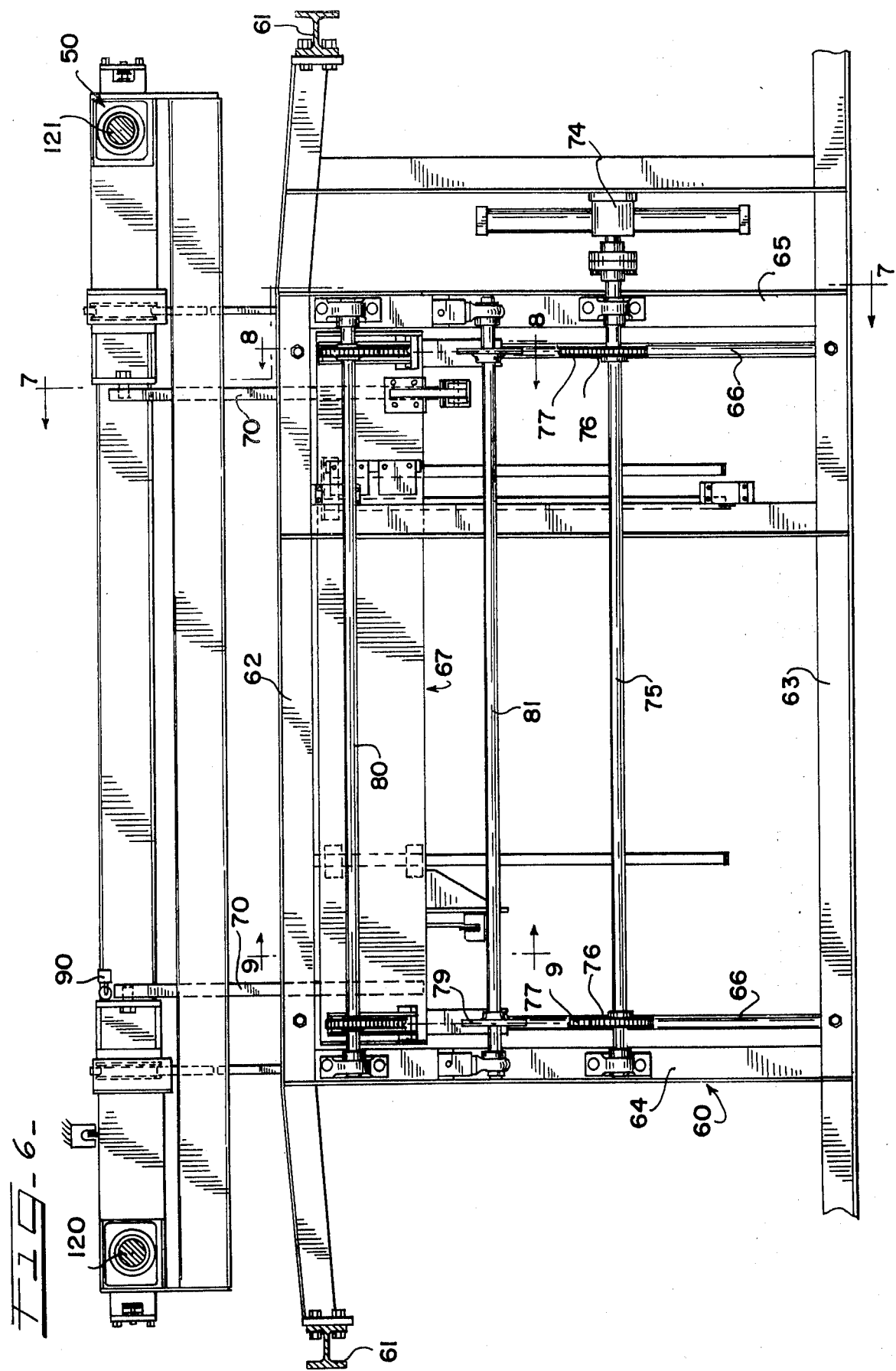

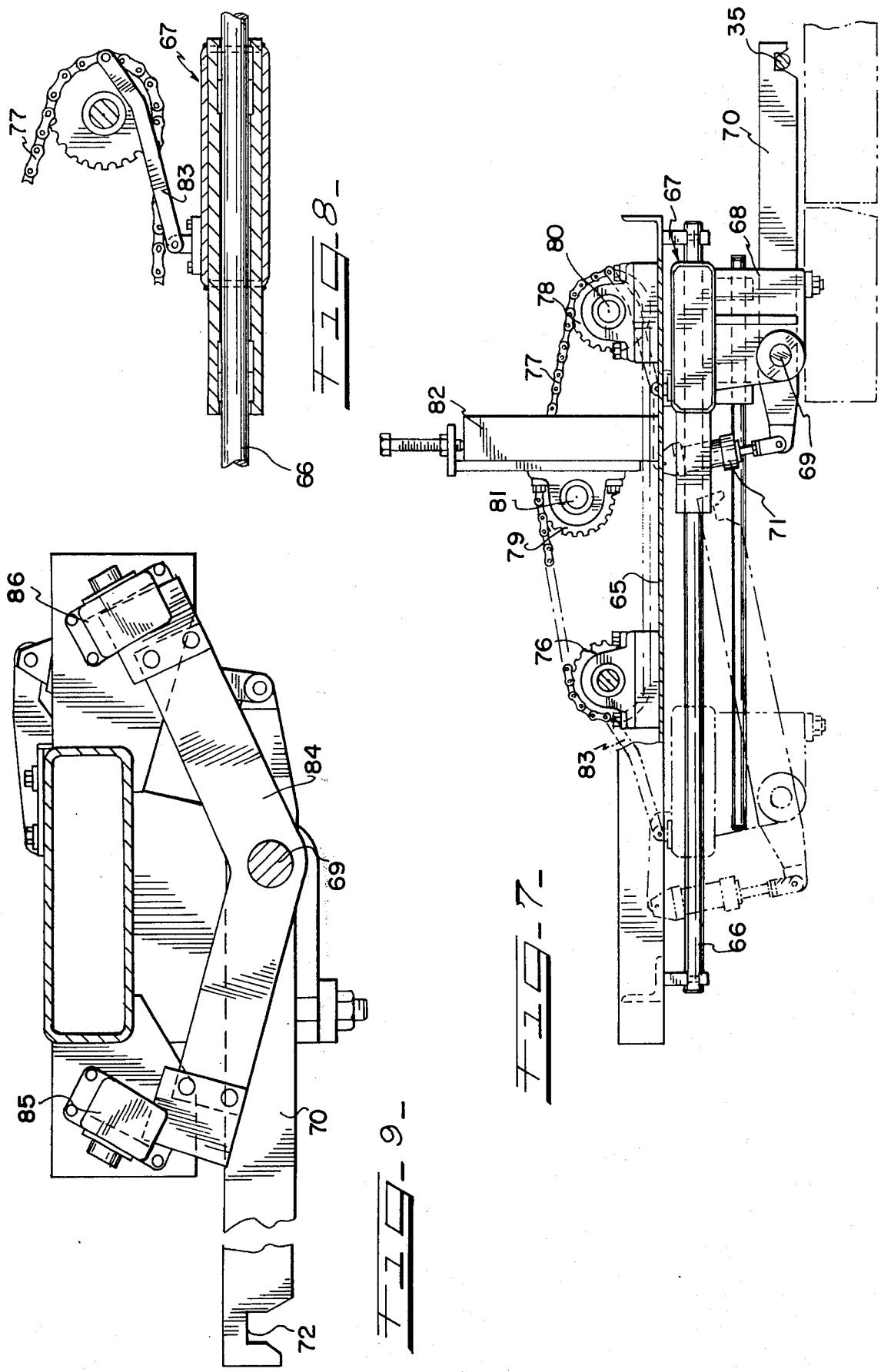

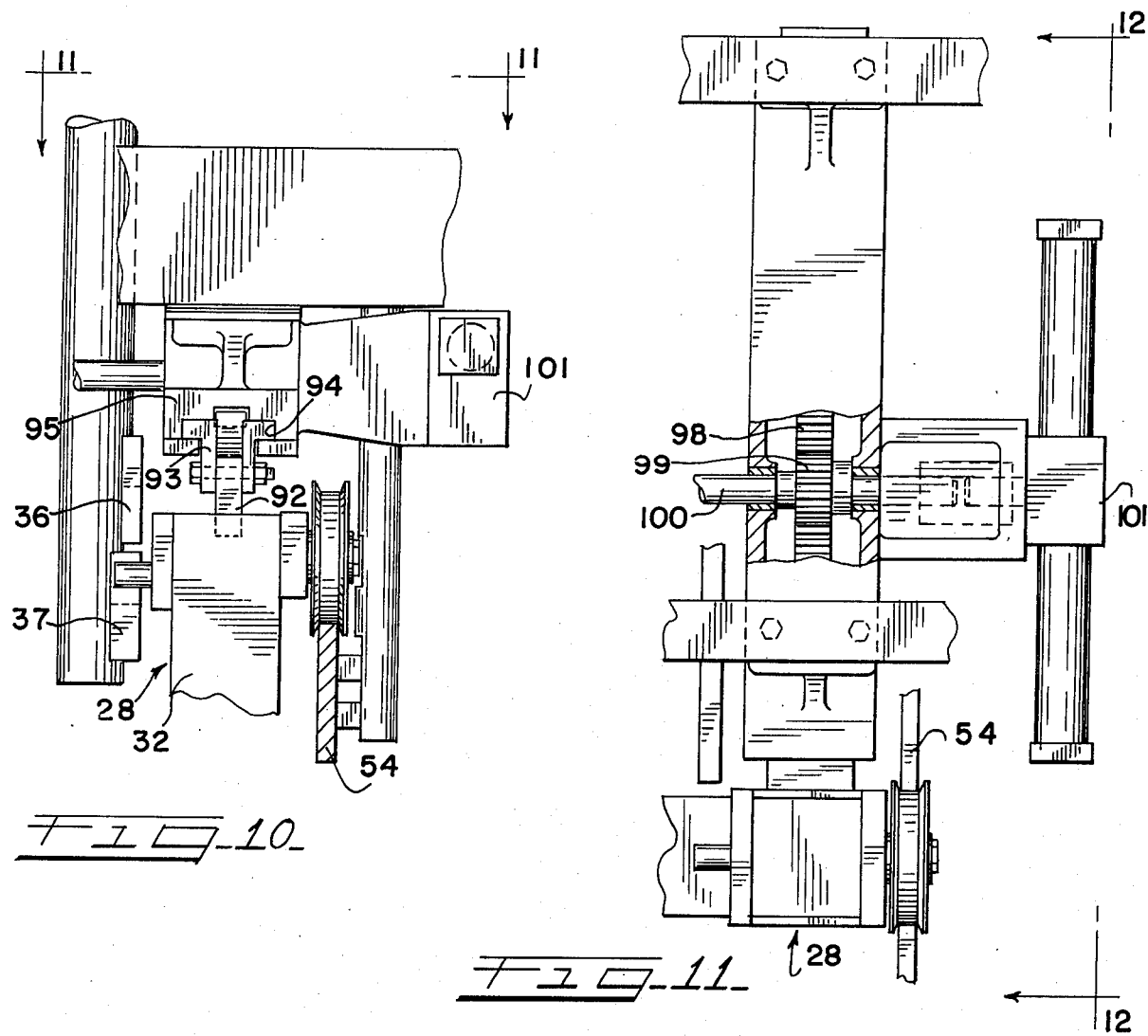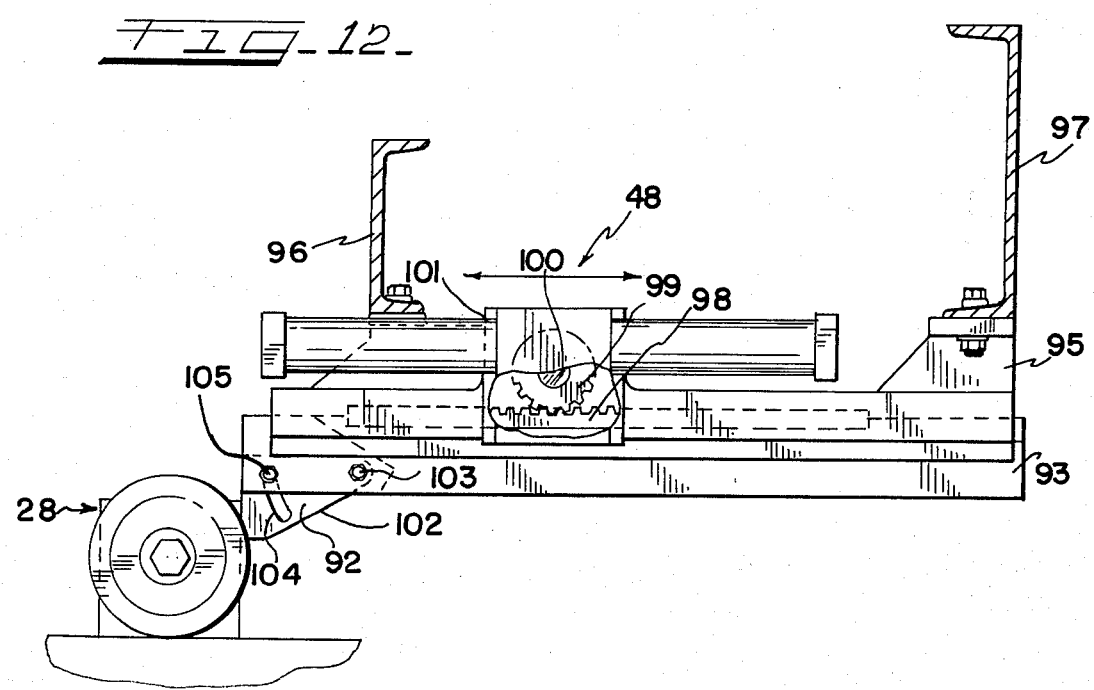

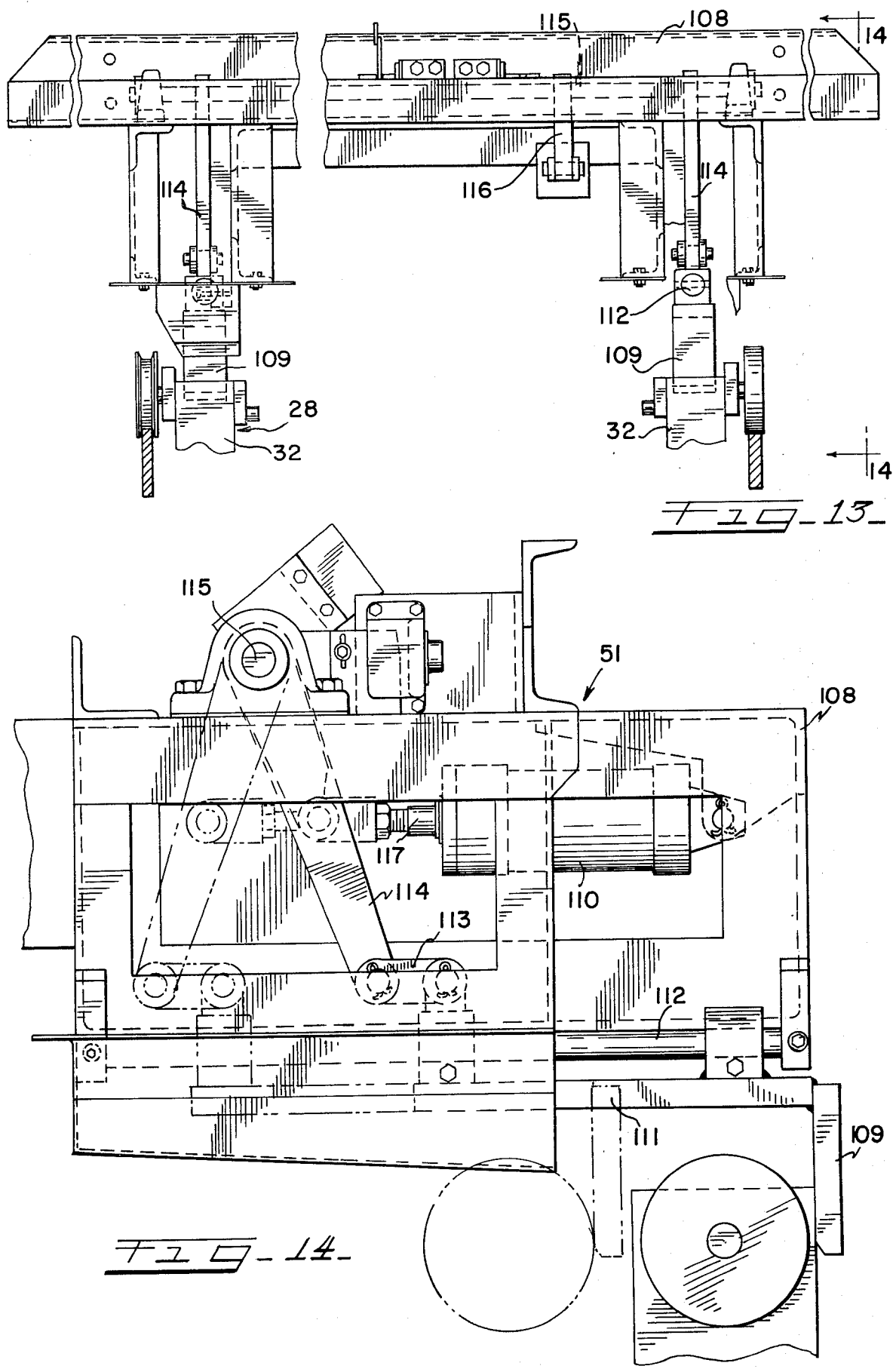

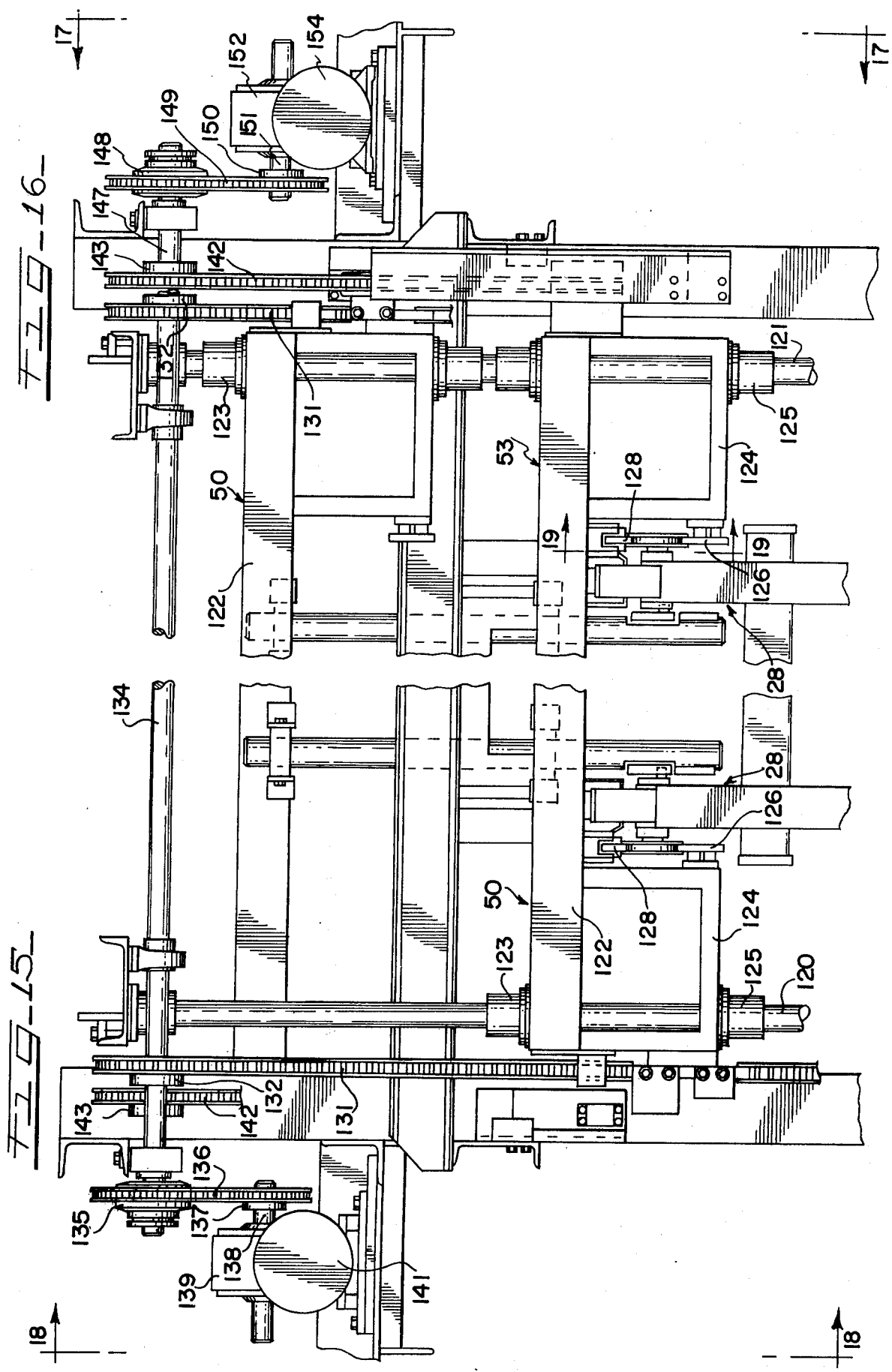

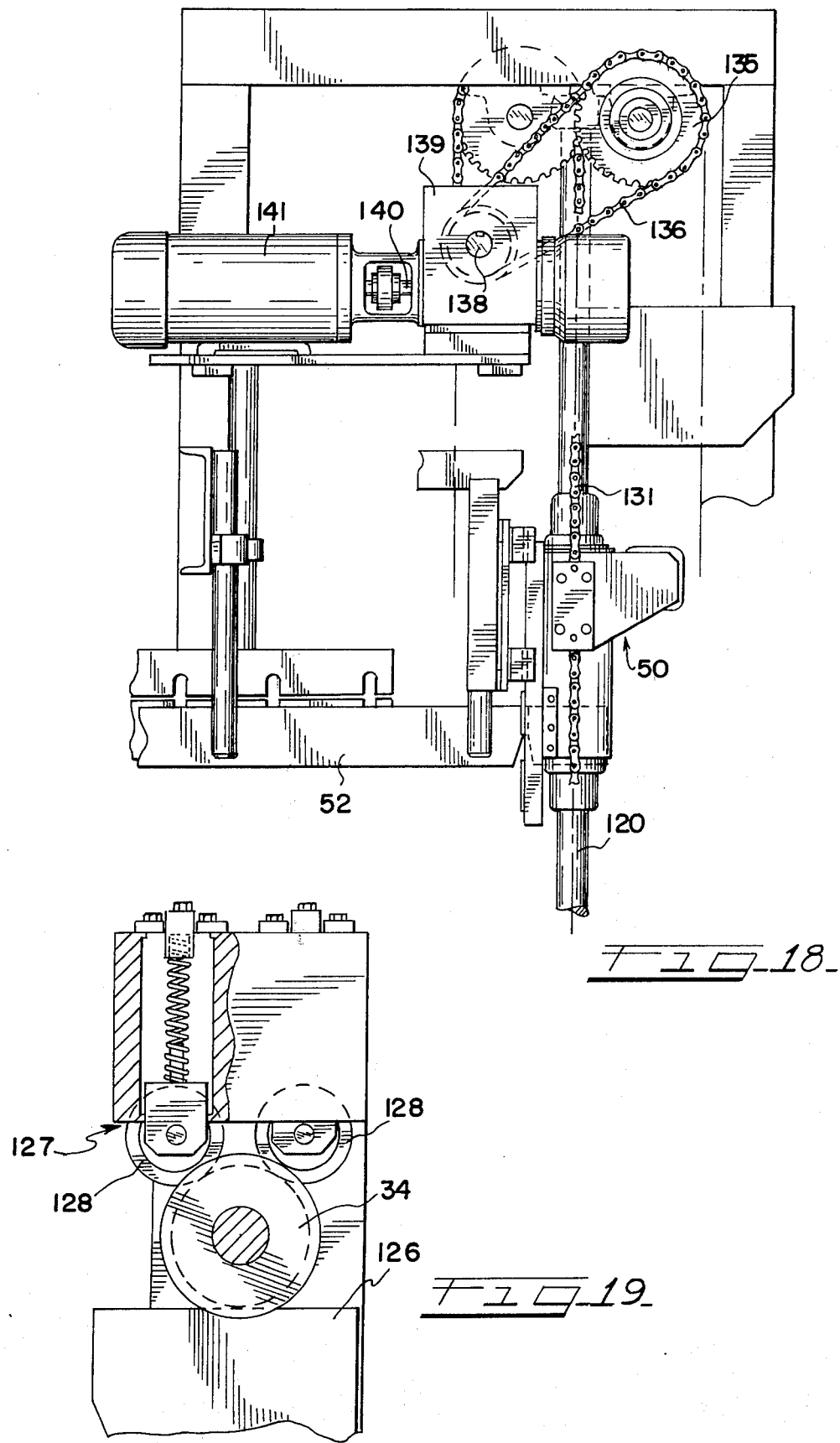

APPARATUS FOR REMOVING MAGAZINES FROM A CLOSED LOOP OF CONTINUOUSLY INDEXED MAGAZINES AND REINSERTING THE MAGAZINES INTO THE LOOP

This invention relates in general to an apparatus for use with a closed loop of indexing magazines to remove magazines on demand from the closed loop to a work station outside the closed loop and for reinserting the magazines into the closed loop after leaving the work station outside the closed loop, and more particularly, to a combination of elevators and transfer mechanisms for handling magazines of loaf molds.

The apparatus of the present invention is particularly useful in a method and apparatus for continuously making a loaf food product, such as a loaf meat, where a plurality of magazines of loaf molds are filled with a stuffable meat material, such as sausage batter or chunk meat, and the magazines of loaf molds are then transported through a plurality of work stations to cook and chill the meat material, remove the loaves of meat from the molds, wash the magazines of loaf molds, and apply a release agent to the loaf molds prior to again filling the molds with a stuffable meat material. Accordingly, the magazines of molds are transported through a closed loop of stations including the cook, chill, product knockout, mold wash and mold release agent application stations. Stuffing of the magazines of molds with a stuffable meat material is handled outside of the closed loop. It is therefore necessary to remove the magazines from the closed loop for the stuffing operation and then return them to the closed loop for processing. The magazines of loaf molds are wheel supported and indexed along tracks by means of an indexing conveyer that includes moving and locking bars which impart to the magazines a step-by-step movement. Accordingly, the present invention is concerned primarily with handling a trolley support unit. However, it can be appreciated the apparatus of the present invention could be applied wherever there would be a closed loop of work stations and the need for removing a trolleyed unit from the closed loop to a work station outside the closed loop and then to reinsert the trolleyed unit back into the closed loop.

The continuous loaf processing system, with which the present apparatus is primarily associated, forms no part of the present invention, but is the subject of another application owned by the assignee of this application. Further, other components of the continuous loaf processing system form the subject of other applications assigned to the assignee of this application.

It is therefore an object of the present invention to provide an apparatus for removing trolleyed units from a closed loop of work stations through which the trolleyed units are continuously indexed and for reinserting the trolleyed units back into the closed loop.

Another object of the present invention is in the provision of the combination of elevators and transfer mechanisms for removing magazines of loaf molds from a closed loop of indexed magazines in a continuous loaf processing system to allow stuffing of the molds at a stuffing station, and for reinserting the magazines of molds back into the closed loop for processing through several work stations.

Other objects, features and advantages of the invention will be apparent from the following detailed disclosure, taken in conjunction with the accompanying sheets of drawings, wherein like reference numerals refer to like parts, in which:

FIG. 4 is a diagrammatic view of the apparatus of the invention to illustrate the manner in which a magazine is removed from the closed loop of the continuous loaf processing system and reinserted into the loop;

FIG. 5 is a diagrammatic view illustrating operation of the apparatus where the stuffing station is bypassed at a time when there is no stuffing operation being carried on;

FIG. 6 is an enlarged top plan view of the center transfer mechanism and taken substantially along line 6—6 of FIG. 2;

FIG. 7 is a sectional view showing in side elevation a part of the center transfer mechanism and taken substantially along line 7—7 of FIG. 6;

FIG. 8 is a sectional view showing a part of the center transfer mechanism and taken substantially along line 8—8 of FIG. 6;

FIG. 9 is a sectional view and showing in elevation a part of the center transfer mechanism and taken substantially along line 9—9 of FIG. 6;

FIG. 10 is a vertical cross-sectional view showing the lower transfer mechanism and taken substantially along line 10—10 of FIG. 3;

FIG. 11 is a top plan view of the lower transfer mechanism with some parts broken away and taken substantially along line 11—11 of FIG. 10;

FIG. 12 is a side elevational view with some parts broken away of the lower transfer mechanism and taken substantially along line 12—12 of FIG. 11;

FIG. 13 is a cross-sectional elevational view looking at the top transfer mechanism and taken substantially along line 13—13 of FIG. 3 and with some parts broken away for purposes of clarity;

FIG. 14 is a side elevational view of the top transfer mechanism and taken substantially along line 14—14 of FIG. 13;

FIG. 15 is a broken front elevational view of the top elevator drive mechanism with the top elevator aligned with the cook rails;

FIG. 16 is a broken front elevational view of the bottom elevator drive mechanism and showing the bottom elevator aligned with the cook rails and the top elevator in its highest position out of the way of the bottom elevator;

FIG. 18 is a side elevational view of the top elevator drive mechanism and taken substantially along line 18—18 of FIG. 15; and FIG. 19 is a broken-away elevational view of the mechanism for holding a magazine in place on the elevator and taken substantially along line 19—19 of FIG. 16.

Figure 1:
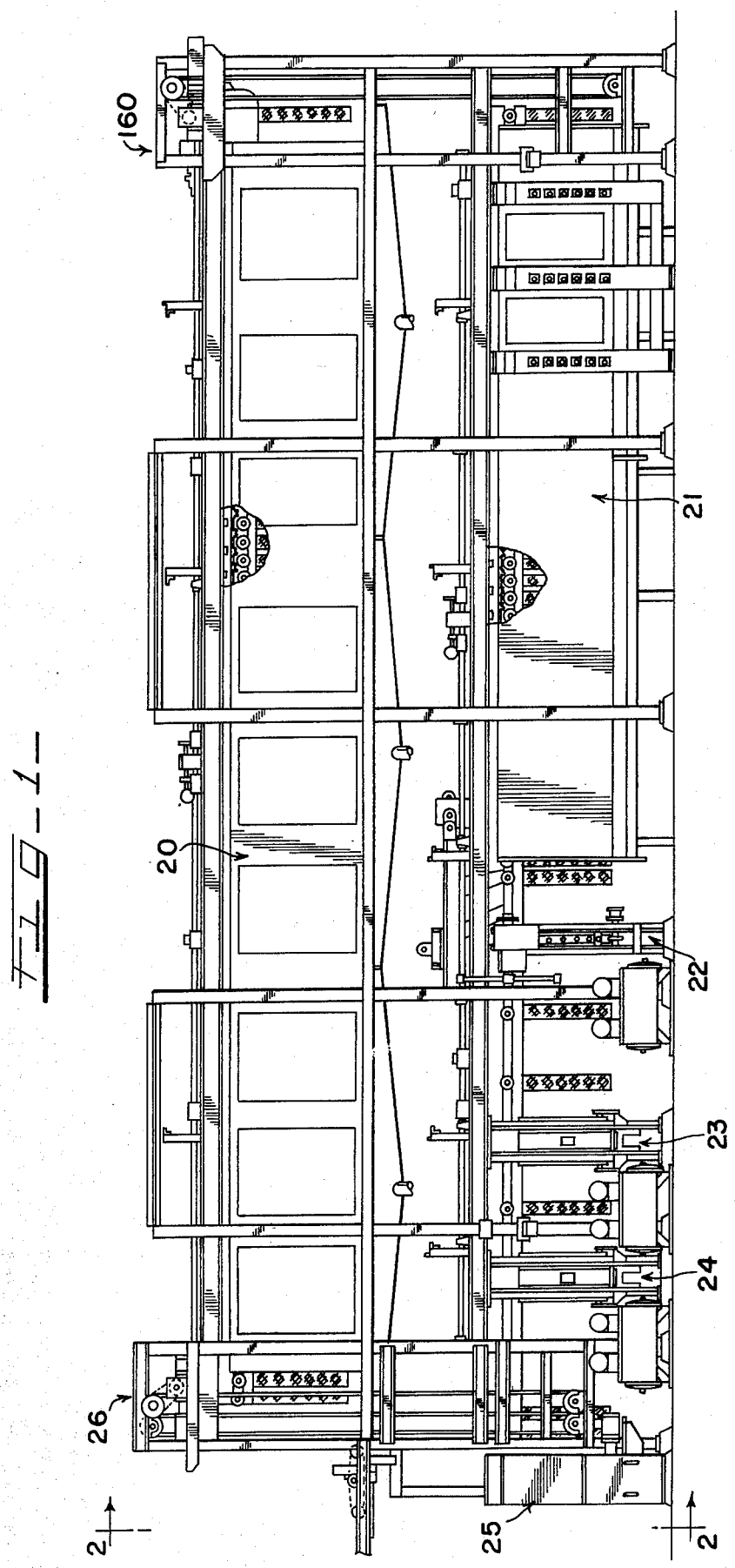
FIG. 1 is an elevational view of a continuous loaf processing system which utilizes the apparatus of the invention for removing magazines of molds from a closed loop and reinserting them back into the closed loop.

Referring now to the drawings, and particularly to the overall view of the continuous loaf processing system in which the present invention is utilized, as shown in FIG. 1, it will be appreciated that magazines of loaf molds move in a step-by-step fashion through a closed loop along an upper run and along a lower run and wherein the apparatus of the present invention is utilized to remove magazines of molds from the discharge end of the lower run and reinsert them into the inlet end of the upper run. A closed loop of work stations is provided in the overall system through which magazines of loaf molds are indexed on a time cycle basis which includes a cooking station through which the magazines of molds are transported during the cooking of the food material within the molds, a chilling station for chilling the food material within the molds, a product knockout station for removal of the loaves of food product from the molds, a mold wash station for washing of the molds in preparation for a further processing cycle, and a release agent application station for applying a suitable release agent to the molds prior to again stuffing them with a stuffable food material. Between the release agent application station and the cooking station, a stuffing station is provided outside the closed loop, where the molds are stuffed with a food material to be cooked and processed. The present invention relates specifically to handling of the magazines of molds between the release agent application station and the cooking station, where during normal stuffing operations, magazines of molds are removed from the closed loop for the stuffing operation and then reinserted into the closed loop for processing.

As seen in FIG. 1, the work stations in the closed loop include the cook station 20, the chill station 21, the product knockout station 22, the mold wash station 23, and the release agent application station 24. The stuffing station 25 is provided outside the closed loop between the release agent application station 24 and the cooking station 20. The apparatus of the present invention, which includes a combination of elevators and transfer mechanisms, is provided in relation to the release agent application station 24, the stuffing station 25 and the cooking station 20 for handling magazines of molds, and is generally indicated by the numeral 26 in FIG. 1.

Figure 2:
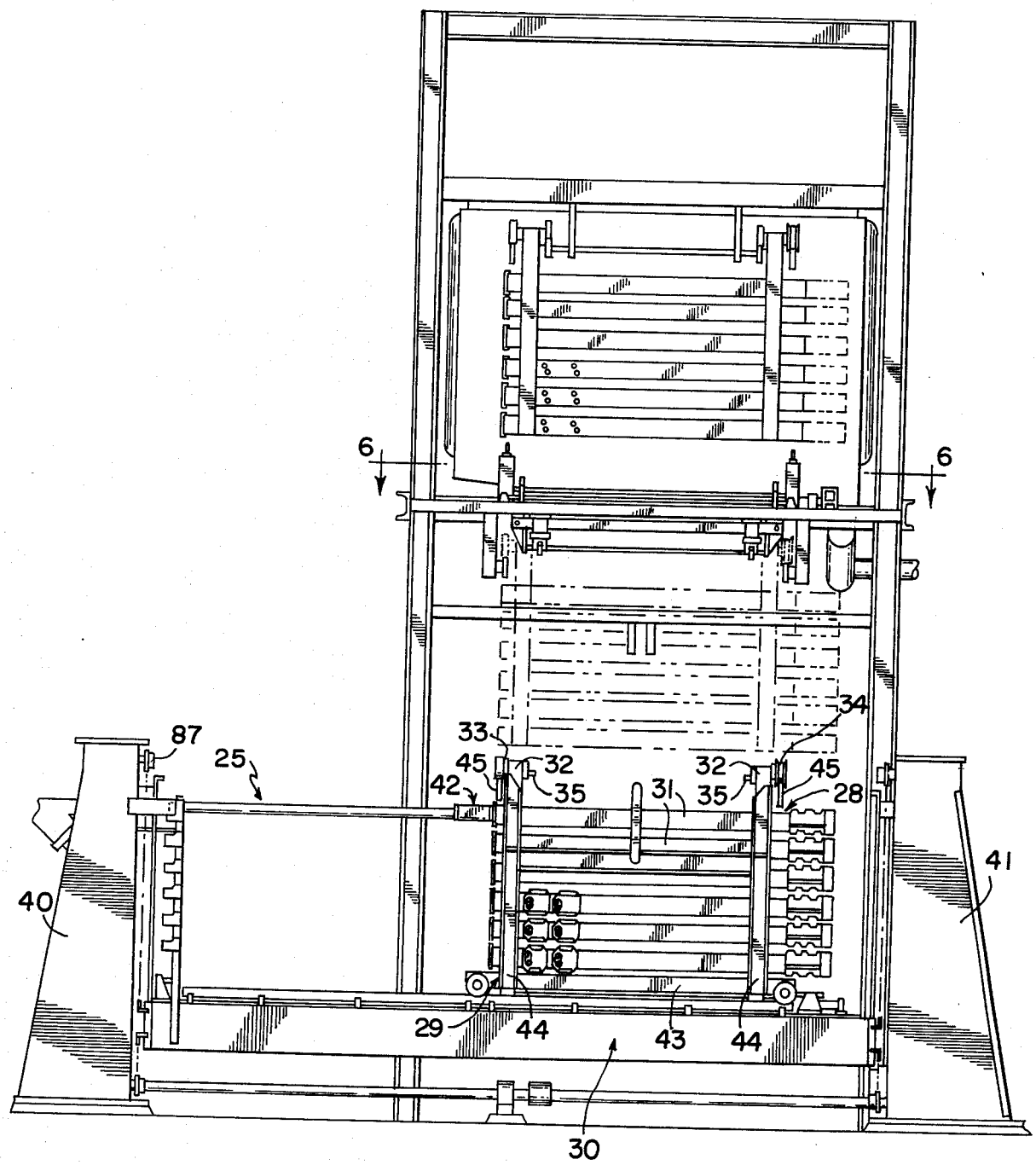
FIG. 2 is an end elevational view of the apparatus of FIG. 1 taken generally along line 2—2 of FIG. 1 and showing the area in which the apparatus of the invention operates.
Figure 3:
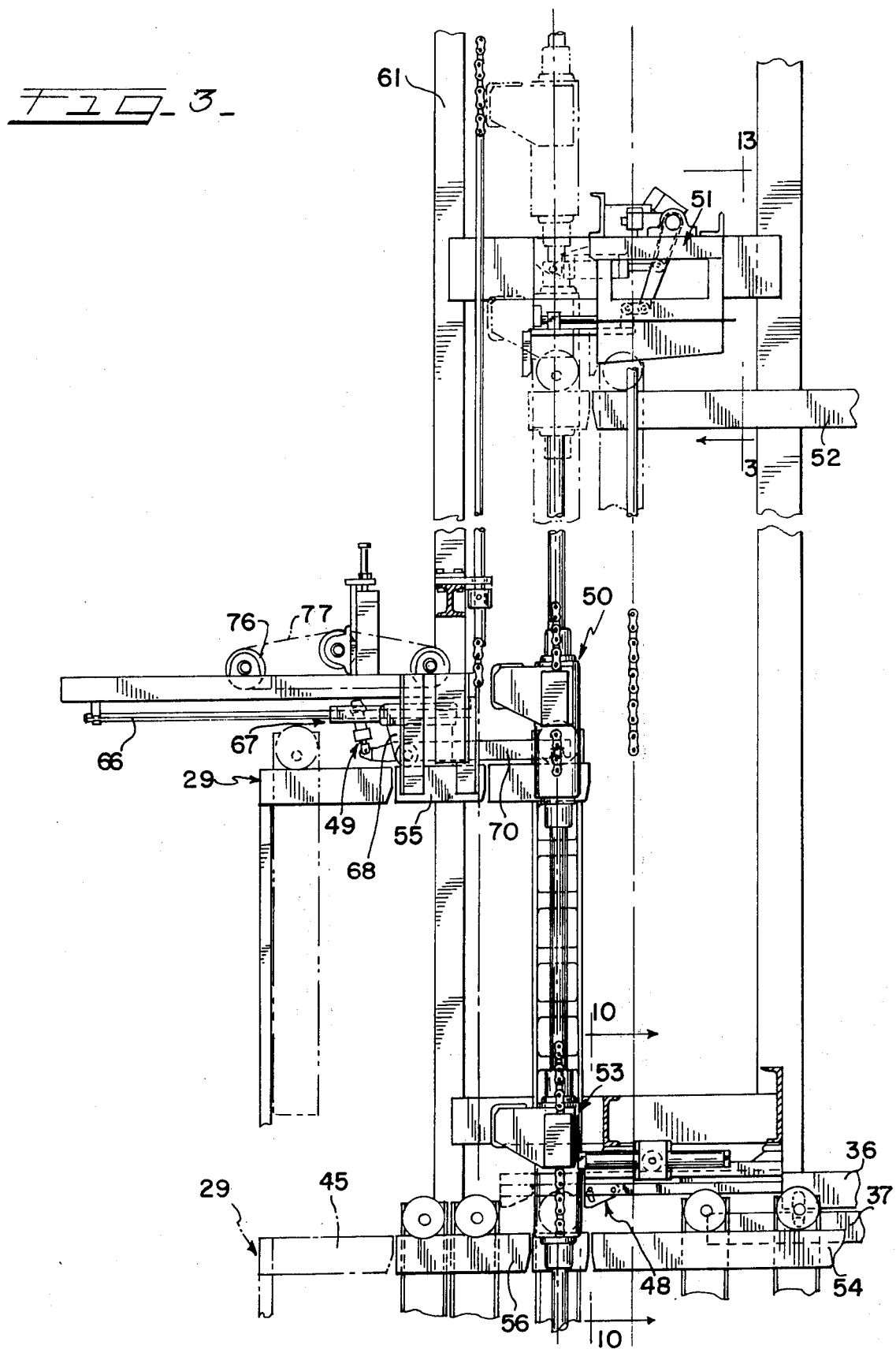
FIG. 3 is an enlarged broken side elevational view of the apparatus of the invention showing the top and bottom elevators, the top, center and lower transfer mechanisms as associated with the stuffing station.

The stuffing station 25 is shown in more detail in FIG. 2, together with a part of the apparatus 26, and where a magazine of loaf molds 28 may be seen in position on the stuffing carriage 29 which is in turn mounted on the stuffing platform 30. The magazine of molds and the stuffing mechanism form no part of the present invention and are the subjects of separate applications owned by the assignee of this application. The magazine of molds generally includes a plurality of horizontally extending and vertically arranged loaf molds 31 interconnected together and between vertically extending forks 32. Wheels 33 and 34 are mounted at the upper ends of the forks on the outsides thereof for coacting with tracks or rails supporting the magazines, while driving pins 35 are mounted on the inner sides of the forks at the upper ends for coacting with an indexing conveyer which includes slotted locking and moving bars 36 and 37, as seen in FIG. 3, that are suitably driven to cause a step-by-step movement to the magazines where the slots of the bars engage the driving pins. The locking bars lock the magazines in position when the moving bars are reciprocating to return to a point where they can again engage and move the magazines. This conveyor forms no part of the present invention but is the subject of a separate application owned by the assignee of this application. However, it will be appreciated that the conveyer does index the magazines along the upper run in the cooking station and along the lower run through the chill, product knockout, mold wash, and release agent application stations.

The stuffing platform 30 is supported between opposing support columns 40 and 41 for movement along the vertical. A suitable mechanism is employed for indexing the platform to sequentially align each mold 31 with a stuffing horn 42 so that traverse of the stuffing carriage along the stuffing platform will cause the molds to move over the stuffing horn so they can be filled with a suitable meat material. It will be appreciated the stuffing carriage 29 includes a base 43, upright channel members 44 extending from the base, and rails or tracks 45 at the upper ends of the chnnels onto which the wheels 33 and 34 of a magazine are received.

The apparatus of the present invention, which accomplishes the handling of magazines between the release agent application station 24, the stuffing station 25 and the cooking station 20, as seen diagrammatically in FIGS. 4 and 5, generally includes a bottom transfer mechanism 48 for transferring magazines out of the closed loop, a center transfer mechanism 49 for transferring magazines from the stuffing carriage 45 after the molds have been stuffed with a meat material onto a top elevator 50, and a top transfer mechanism 51 for transferring magazines from the top elevator onto the cook rails 52 in the cook station 20. A bottom elevator 53, which is essentially a part of the closed loop, functions to maintain an empty magazine within the closed loop, thereby bypassing the stuffing station in the event the stuffing station is not operating. The bottom elevator 53 first receives magazines from the chill rails 54 which are along the lower run of the overall system. It will be appreciated that the magazines in the closed loop are advanced step-by-step at predetermined time intervals in accordance with the programming of the overall system.

When the system is full of magazines at the end of each timed interval, a magazine is transferred by the moving rail at the chill tracks onto the bottom elevator 53. In the event a magazine of stuffed molds is to be reinserted into the closed loop and, as shown in FIG. 4, a magazine is transferred from the stuffing carriage 45 by the center transfer mechanism 49 over stationary rails 55 onto the rails of the top elevator 50, and the bottom transfer mechanism 48 functions to transfer the magazine on the bottom elevator 53 into a storage area on storage tracks 56. The bottom elevator then remains in position in alignment with the chill rails 54, while the top elevator 50 transports the magazine received from the stuffing carriage upwardly into alignment with the cook rails 52. Thereafter, the top transfer mechanism 51 transfers the magazine from the top elevator onto the cook rails 52 and at the first position at the inlet end of the cook rails. Slight recesses 57 are provided in the storage tracks 56 to facilitate positioning of the magazines at the storage area. Therefore, it can be appreciated when a magazine of stuffed molds is to be reinserted into the closed loop, the magazine removed from the discharge end of the chill rails is transferred to the storage area at the stuffing station. Further, when it is desired to transfer a magazine of molds onto the stuffing carriage when it is empty, such is accomplished manually by the operator at the stuffing station.

In the event no magazine of stuffed molds is to be inserted into the closed loop within the predetermined period of time for advancing the magazines within the closed loop, the apparatus is programmed to drive the bottom elevator upwardly, as illustrated in FIG. 5, to place the rails of the bottom elevator into alignment with the cook rails 52 so that the top transfer mechanism 51 can transfer the empty magazine from the bottom elevator onto the cook rails. Thereafter, the bottom elevator will return to its lower position in alignment with the chill rails 54. In the event that the bottom elevator operates to bypass the magazine thereon from the stuffing station, the top elevator 50 is programmed to move out of the way of the bottom elevator into the upper position, as shown in FIG. 5, it being here appreciated these elevators are in vertical alignment with each other, and they are guidably supported on common guideposts. Accordingly, the bottom transfer mechanism, the center transfer mechanism, and the top elevator do not need to function to handle a magazine in order to allow the closed loop of indexed magazines to operate.

The center transfer mechanism 49, as seen most clearly in FIGS. 3 and 6 to 9, is supported above the stuffing station by a rectangular framework of channels 60 arranged between a plurality of upstanding beams, of which beams 61 are shown, especially in FIG. 6. The framework 60, as seen in FIG. 6, includes front and back parallel extending channels 62 and 63 interconnected by end channels 64 and 65. Supported from the framework are a pair of parallel extending guide bars 66 along which a carriage 67 is guidably supported. A pair of opposed downwardly extending plates 68 rotatably support a shaft 69 on which is mounted a pair of hook arms 70. The shaft 69 and hook arms 70 are rocked on the carriage 67 by means of a hydraulic cylinder 71 to disengage the slots 72 from driving pins 35 of a magazine after the magazine has been transferred to the top elevator and to thereafter reposition the arms for engagement with magazine pins on the stuffing carriage. The carriage 67 is driven from the position shown in FIGS. 3, 6 and 7 in solid lines at the conclusion of a transfer stroke to the position shown in dotted lines in FIG. 7 at the conclusion of a return stroke so that the hook arms can once again engage the pins of a magazine being brought up to the center transfer mechanism by the stuffing carriage 29. When the hook arms have fully returned, they are locked to the position so that they may again engage driving pins on a magazine being elevated by the stuffing carriage.

Reciprocation of the center transfer carriage 67 and the hook arms 70 is achieved by a hydraulically operated rotary actuator 74, FIG. 6, which drives a shaft 75 supported between end channels 64 and 65 and having sprockets 76 mounted thereon. Chains 77 are trained over the sprocket 76 and over driven sprockets 78 and chain take-up sprockets 79. The driven sprockets 78 are mounted on a shaft 80 extending parallel to shafts 75, while the take-up sprockets 79 are mounted on a shaft 81 extending parallel to the shafts 75 and 80. Both shafts 80 and 81 are suitably supported on the end channels 64 and 65. Further, it can be best seen in FIG. 7 that a take-up mechanism 82 is provided for the shaft 81 so that the chains 77 may be maintained suitably taut. Links 83 pivotally connected at one end to the chains 77 and at the other end to the carriage 67 provide the driving connection between the chains and the carriage. Accordingly, operation of the rotary actuator 74 will cause the hook arms 70 to traverse the transfer and return strokes. As seen in FIG. 9, an arm 84 mounted on the hook arm shaft 69 coacts with limit switches 85 and 86 for the purpose of sensing the position of the hook arms 70. Operation of the rotary actuator 74 and the hydraulic cylinder 71 are coordinated to cause the hook arms to be in their down position during the transfer stroke for engagement with driving pins on a magazine and in their up position during the return stroke.

Sequential operation of the center transfer mechanism is commenced when a magazine of molds is elevated by the stuffing carriage 29 to the center transfer mechanism which is sensed by actuation of a limit switch 87 mounted on the support column 40 at the stuffing station. A suitable actuating mechanism is provided on the stuffing platform 30 for actuating the limit switch. Accordingly, it will be appreciated the cycle of operation of the apparatus 26 is commenced when a magazine is elevated by the stuffing carriage to the center transfer mechanism.

A limit switch 90 is actuated when a magazine is fully transferred by the center transfer mechanism onto the top elevator 50. This limit switch is shown in FIG. 6 and functions to cycle operation of the bottom transfer mechanism 48 to transfer a magazine from the bottom elevator 53 into a storage area of the stuffing station and to cause the top elevator 50 to raise the magazine thereon to the level of the cook rails 52 after which the top transfer mechanism 51 can then transfer the magazine from the top elevator onto the cook rails.

The bottom transfer mechanism 48 is shown in more detail in FIGS. 10 to 12 and includes a pusher bar 92 pivotally mounted on a T-shaped slide bar 93 slidably mounted in guideways 94 formed in an elongated body 95 carried on and supported from cross beams 96 and 97. A rack gear 98 is suitably secured to the slide bar 93 along its top edge for engagement with a pinion gear 99 fastened to a bearingly mounted shaft 100. A hydraulic rotary actuator 101 is coupled to the shaft 100 for driving the pinion gear 99 and imparting transfer and return strokes to the slide bar 93 and pusher 92. While only a single pusher bar 92 is shown, it will be appreciated that one is provided on each side for having the nose of the pusher bar engaging with both forks of a magazine 28 when a magazine is being transferred from the rails on the bottom elevator 53 into the storage area of the stuffing station. The shaft 100 extends to a second pinion gear which drives a second rack gear and pusher bar. The pusher bar 92, in its return position ready for transferring a magazine to the storage rails 56, has its nose in alignment with a magazine at the bottom elevator 53. During the transfer stroke, the bottom transfer is operated to first move the pusher bars 92 through the transfer stroke to the position shown in dotted lines in FIG. 3 and return it to the position shown in solid lines. When a subsequent magazine is transferred by the moving bar 37 of the lower indexing conveyor onto the bottom elevator, the pusher bar 92 pivots out of the way by cam action against the pusher bar. The side of the pusher bar facing an on-coming magazine includes an inclined cam surface 102 which is engaged by a magazine and causes the pusher bar to pivot about a pin 103. The pusher bar, after the magazine reaches the bottom elevator, gravitationally returns to its pushing position, or it may be resiliently biased to its pushing position. A slot 104 formed in the pusher bar coacts with a pin 105 to limit the pivotal movement of the pusher bar. Accordingly, the bottom transfer mechanism 48 functions to transfer the magazine from the bottom elevator 53 into the storage area of the stuffing station when a magazine of stuffed molds is being reinserted into the closed loop of the overall system.

Once a magazine has been elevated by the top elevator 50 to the cook rails 52, a top transfer mechanism 51 functions to transfer that magazine onto the cook rails. The details of the top transfer mechanism are shown in FIGS. 3, 13 and 14. The top transfer mechanism is supported by a framework 108 which is in turn supported on upstanding beams or columns. A pair of pusher bars 109 aligned for engagement with the forks 32 of a magazine 28 are reciprocated by a hydraulic cylinder 110. The top transfer mechanism 51 operates to not only transfer magazines from the top elevator 50 but also from the bottom elevator 53 when either is in alignment with the cook rails 52. Each pusher bar 109 is supported by a slide carriage 111 slidably mounted on a guide bar 112, the latter of which is suitably supported by the framework 108. A clevis 113 connects each slide carriage 111 to a crank arm 114 mounted on a transversely extending crank shaft 115 that is carried on the framework 108. A driving crank arm 116 extends from the crank shaft 115 to be connected to the piston rod 117 of cylinder 110. When a magazine is positioned at the cook rails by either the top elevator or the bottom elevator, the pusher bars 109 are in their return positions so that the pusher bars will be positioned behind the forks on the magazine to engage the forks and push the magazine onto the cook rails during the transfer stroke of the top transfer mechanism. Thereafter, the pusher is returned to its home position through the return stroke and ready for the next magazine. The top transfer is programmed with the overall system to operate at the end of each predetermined period of time when the magazines are indexed in the system.

Structurally, the lower elevator 53 and the top elevator 50 are identical in structure although independently driven of one another. Moreover, the top elevator 50 is located directly above the bottom elevator 53 and they move in guided relation along the same two vertical guideposts 120 and 121, as seen in FIGS. 6, 15 and 16. Looking at FIGS. 15 and 16, which show both opposite sides of the top elevator 50 and one side of the bottom elevator 53, it will be seen that each elevator includes a cross bar 122 fitted with sleeve bearings 123 at each end for receiving the guideposts 120 and 121. A U-shaped brace 124 depends from each end of the cross bar 122 and is also fitted with sleeve bearings 125 for slidably receiving the guideposts 120 and 121. At the inner sides of the U-shaped frames 124, rail sections 126 are suitably mounted for receiving and supporting a wheeled magazine 28. In order to maintain a magazine in proper position on the elevator, a detented stop-and-hold mechanism 127 is provided in connection with each rail 126, as seen in FIG. 19. A wheel 34 from a magazine is shown in detented locked position, FIG. 19, wherein spring biased rollers 128 coacting together as a pair, capture and hold the wheel 34 in place on the rail 126. It can be appreciated that the rollers 128 move out of place as a force sufficient to overcome the biased force of the rollers is provided to either push a magazine onto the rails of an elevator or to push a magazine off the rails of an elevator.

The upper or top elevator 50 is driven along the guideposts by a chain drive arrangement which includes a pair of chains 31 vertically arranged and connected one at each side of the elevator and trained over upper sprockets 132 and lower sprockets 133. The sprockets 132 are mounted on a cross shaft 134 suitably bearingly supported between opposed frame members and which also has a sprocket 135 mounted thereon connected through a chain 136 to a sprocket 137 carried on the output shaft 138 of a gear box 139. The gear box 139 includes an input shaft 140 connected to the shaft of a reversible motor 141.

Figure 17:
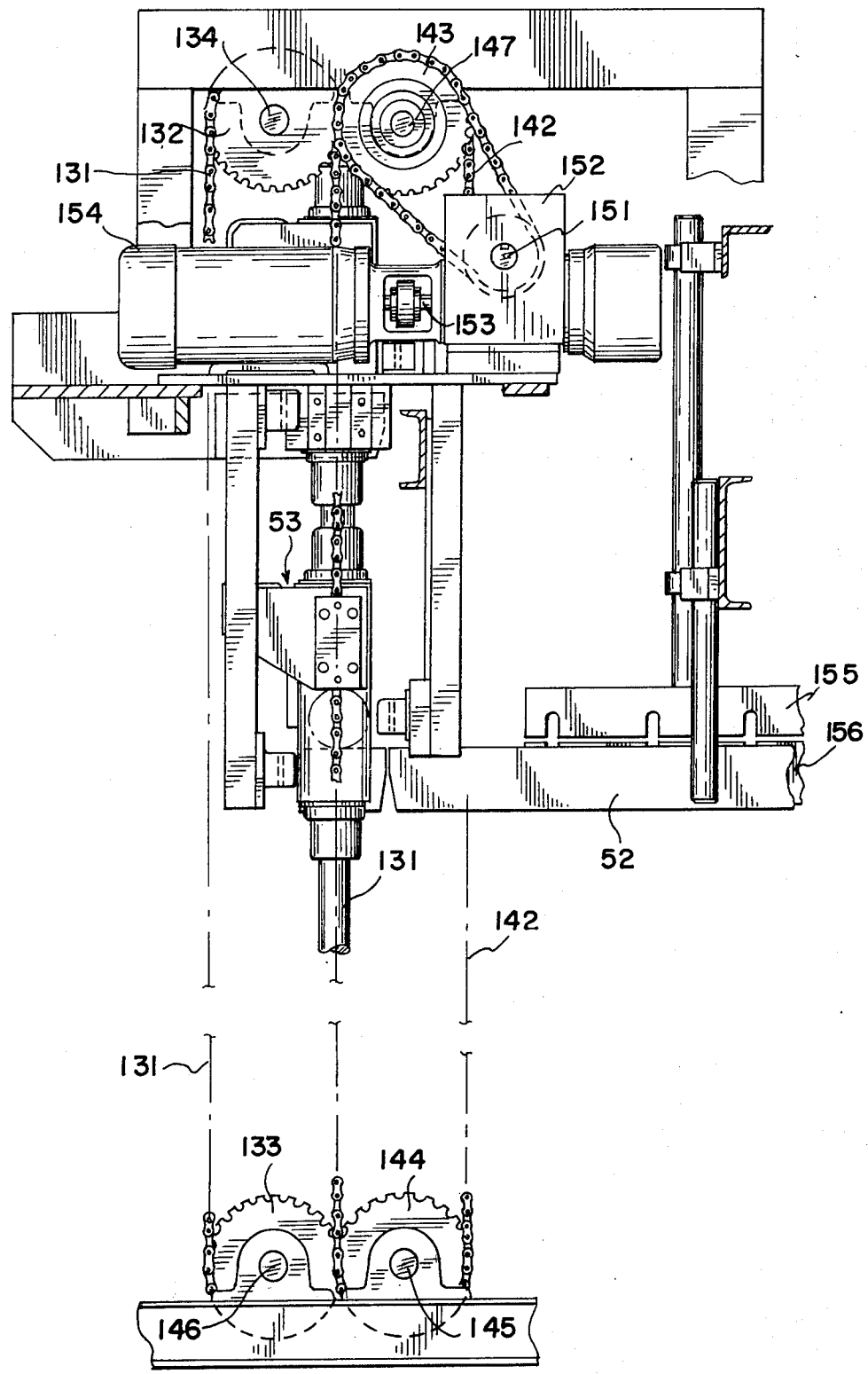
FIG. 17 is a side elevational view of the bottom elevator drive mechanism with some parts broken away for purposes of clarity and taken substantially along line 17—17 of FIG. 16.

Similarly, the bottom elevator is connected to and driven by vertically arranged and horizontally spaced apart drive chains 142 trained over upper sprockets 143 and lower sprockets 144. The lower sprockets 144 are mounted on a cross shaft 145 and similarly the lower sprockets 133 of the upper elevator drive are mounted on a cross shaft 146, as seen in FIG. 17. The chains 142 are also connected to the opposite sides of the bottom elevator by suitable brackets as were the chains 131 connected to the top elevator. Upper sprockets 143 are mounted on a cross shaft 147 suitably supported by the framework and which also has a sprocket 148 driven through a chain drive. Sprocket 148 has a drive chain 149 trained thereover and also over a sprocket 150 mounted on an output shaft 151 of a gear box 152, as seen in FIGS. 16 and 17. The gear box includes an input shaft 153 connected to the shaft of a reversible motor 154.

Looking at FIGS. 15 and 16, it will be noted in FIG. 15 that the top elevator 50 is at the level where the wheel supporting rails are in alignment with the cook rails 52 so that a magazine on the top elevator can be transferred to the cook rails. Similarly, in FIG. 16, the bottom elevator 53 is at a position in alignment with the cook rails where a magazine on the bottom elevator can be transferred to the cook rails. Also, as noted in FIG. 16, the top elevator 50 is above the bottom elevator and out of its way. The programming for handling the movements of the top and bottom elevator is such that when the bottom elevator is bringing an empty magazine up to the cook rails, the top elevator must be moved out of the way of the bottom elevator to avoid a collision and allow the bottom elevator to reach the cook rails to permit transfer of a magazine on the bottom elevator to the cook rails. As may be seen in FIG. 17, the conveyor for moving magazines along the cook rails 62 is diagrammatically illustrated wherein a moving bar 155 is shown, together with a locking bar 156.

In view of the foregoing, it will be appreciated the apparatus 26 of the invention at the stuffing end of the overall system includes a bottom transfer mechanism for transferring magazines of loaf molds from a bottom elevator into the storage area of the stuffing station, a center transfer mechanism for transferring magazines of molds from the stuffing carriage onto the top elevator, and the top elevator for transferring the magazines from the center transfer area to the cook rails. Additionally, a top transfer mechanism is provided for transferring the magazines from either the bottom elevator or the top elevator onto the cook rails. The bottom elevator functions to bring a magazine of molds from the chill rails to the cook rails in the event that no magazine is being reinserted into the closed loop from the stuffing station. The magazines are moved onto the bottom elevator from the chill rails by the moving rail along the chill rails. It will be recognized that operation of the apparatus 26 is programmed in timed relation with the step-by-step movement of the magazines.

It will also be appreciated that at the discharge end of the cook rails and at the inlet end of the chill rails, a lowerer 160, as seen generally in FIG. 1, is provided for transferring the magazines from the discharge end of the cook rails to the chill rails. The lowerer 160 is structurally identical to the bottom elevator 53 and functions to detent into position a magazine on the lowerer at the discharge end of the cook rails. The magazines are moved into the lowerer from the cook rails by the cook moving bars and off the lowerer onto the chill rails by the chill moving bars. It will be appreciated that the elevators move initially at a fast speed and shift to a slow speed just prior to stopping in order to take a minimum amount of time to complete a movement between positions.

It will be understood that modifications and variations may be effected without departing from the scope of the novel concepts of the present invention, but it is understood that this application is to be limited only by the scope of the appended claims.

The invention is hereby claimed as follows:

1. In a system for continuously processing track supported wheeled units through a plurality of work stations including a plurality of work stations located within a closed loop having first and second track runs, at least one work station located outside the closed loop, and a first elevator means receiving each unit from the outlet end of said first track run and selectively bypassing the work station outside the closed loop by transferring the unit directly to the inlet end of the second track run, mechanism for removing a unit from the closed loop at said outlet end of said first track run for the work station outside the closed loop and reinserting a unit into the closed loop at said inlet end of said second track run comprising: a first transfer means for transferring a unit from the first elevator means to the work station outside the closed loop, a second elevator means for receiving a unit from the work station outside the closed loop and transporting the unit to the inlet end of said second track run to reinsert same into the closed loop, and a second transfer means for transferring a unit from either the first or second elevator means into the closed loop at the inlet end of said second track run.

2. The mechanism as defined in claim 1, which further includes a third transfer means for transferring a unit from the work station outside the closed loop to said second elevator means.

3. The mechanism as defined in claim 2, wherein each said elevator means includes means detent locking a magazine thereon.

4. The mechanism as defined in claim 1, which further includes means driving the first elevator means to transport a unit thereon directly to the inlet end of said second track run when no unit is presented to the second elevator means to be reinserted in the closed loop within a predetermined time interval.

5. The mechanism as defined in claim 4, which further includes means driving said first transfer means when a unit is presented to said second elevator means to transfer a unit from said first elevator means to said work station outside closed loop.

6. The mechanism as defined in claim 2, which further includes means driving said third transfer means when a unit is presented to said second elevator means.

7. In a continuous loaf processing system for producing a molded loaf food product from a stuffable food material including a plurality of wheel supported magazines of loaf molds being driven step-by-step at predetermined time intervals along tracks through a closed loop of work stations defined by an upper run along which the magazines are driven in one direction, a lower run aligned below the upper run along which the magazines are driven in the opposite direction, a lowerer at the discharge end of the upper run for transferring magazines one at a time from the discharge end of the upper run to the inlet end of the lower run, a bottom elevator at the discharge end of the lower run and the inlet end of the upper run for transferring a magazine directly from the lower run to the upper run, and a stuffing station adjacent the discharge end of the lower run and the inlet end of the upper run for stuffing food material into the molds, mechanism for selectively removing a magazine of molds from the closed loop at the discharge end of the lower run on demand for the stuffing station and reinserting a magazine of molds following stuffing into the closed loop at the inlet end of the upper run, said mechanism comprising: a bottom transfer means for transferring a magazine of molds from the bottom elevator to the stuffing station, a top elevator for receiving a magazine of stuffed molds from the stuffing station, a center transfer means for transferring a magazine of stuffed molds from the stuffing station to the top elevator, means driving the top elevator to the upper run, and an upper transfer means for transferring a magazine of molds from the top or bottom elevator in alignment with the upper run onto the upper run.

8. The mechanism as defined in claim 7, which further includes means driving the bottom elevator to transport a magazine of molds thereon directly from the discharge end of the lower run to the inlet end of the upper run when no magazine is presented to the top elevator within the time interval.

9. The mechanism as defined in claim 7, which further includes means driving said center transfer means when a magazine is presented to the top elevator to transfer a magazine from the stuffing station to the top elevator and to drive the bottom transfer means to transfer a magazine on the bottom elevator to the stuffing station.

10. The mechanism as defined in claim 7, wherein said top and bottom elevators move along the same path to the upper run, and which further includes means for driving the top elevator to a position above the upper run out of the way of the bottom elevator when the bottom elevator transports a magazine of molds from the lower run to the upper run.

11. In a continuous loaf processing system for producing a molded loaf meat product from a stuffable meat material including a plurality of wheel supported magazines of loaf molds being driven step-by-step at predetermined time intervals along tracks through a closed loop of work stations defined by an upper run along which the magazines are driven in one direction, a lower run aligned below the upper run along which the magazines are driven in the opposite direction, a lowerer at the discharge end of the upper run for transferring magazines one at a time from the discharge end of the upper run to the inlet end of the lower run, a bottom elevator at the discharge end of the lower run and the inlet end of the upper run for transferring a magazine directly from the lower run to the upper run, and a stuffing station adjacent the discharge end of the lower run and the inlet end of the upper run for stuffing food material into the molds having a storage area for first receiving magazines and a vertically movable stuffing platform on which a magazine is mounted during stuffing of the molds, mechanism for selectively removing a magazine of molds from the closed loop at the discharge end of the lower run on demand for the stuffing station and reinserting a magazine of molds following stuffing into the closed loop at the inlet end of the upper run, said mechanism comprising: a bottom transfer means for transferring a magazine of molds from the bottom elevator to the storage area of the stuffing station, a top elevator for receiving a magazine of stuffed molds from the stuffing platform, a center transfer means for transferring a magazine of stuffed molds from the stuffing platform to the top elevator, means driving the top elevator to the upper run, and a top transfer means for transferring a magazine of molds from the top or bottom elevator in alignment with the upper run onto the upper run.

12. The mechanism as defined in claim 11, which further includes common vertically extending guide means along which the top and bottom elevators move to the upper run, and means for driving the top elevator to a position above the upper run out of the way of the bottom elevator when the bottom elevator transports a magazine of molds from the lower run to the upper run.

13. The mechanism as defined in claim 12, which further includes means driving the bottom elevator to transport a magazine of molds thereon directly from the discharge end of the lower run to the inlet end of the upper run when no magazine is presented to the top elevator within the time interval.

14. The mechanism as defined in claim 12, which further includes means driving said center transfer means when a stuffed magazine is presented to the top elevator by the stuffing platform to transfer the magazine from the stuffing platform to the top elevator and to drive the bottom transfer means to transfer a magazine on the bottom elevator to the storage area.

15. The mechanism as defined in claim 14, which further includes means synchronously driving said top transfer means with the time interval of driving magazines along the upper and lower runs to transfer a magazine from the top or bottom elevator onto the upper run in timed relation.

16. The mechanism as defined in claim 15, which further includes means programming the operation of the mechanism in timed relation to the driving of magazines on the upper and lower runs.

17. In a system for continuously processing track supported wheeled units through a plurality of work stations wherein a plurality of work stations are located within a closed loop having first and second track runs and at least one work station is located outside the closed loop, mechanism for transferring magazines one at a time from the outlet end of one run to the inlet end of the other run comprising: an elevator having a track section selectively alignable with the ends of either track run, means for driving the elevator between said track runs, and means on the track section of the elevator for holding a wheeled unit thereon at a predetermined location during transfer, said holding means including a pair of coacting spring biased rollers mounted above the track section in alignment with the path of a wheel of a unit such that the upper portion of the wheel may be engaged and held thereby at a given location when aligned between said rollers.

18. In a continuous loaf processing system for producing a molded loaf meat product from a stuffable meat material including a plurality of wheel supported magazines of loaf molds being driven step-by-step at predetermined time intervals along tracks through a closed loop of work stations defined by an upper run along which the magazines are driven in one direction, a lower run aligned below the upper run along which the magazines are driven in the opposite direction, a lowerer at the discharge end of the upper run for transferring magazines one at a time from the discharge end of the upper run to the inlet of the lower run, a bottom elevator at the discharge end of the lower run and the inlet end of the upper run for transferring a magazine directly from the lower run to the upper run, and a stuffing station adjacent the discharge end of the lower run and the inlet end of the upper run for stuffing food material into the molds having a storage area for first receiving magazines and a vertically movable stuffing platform on which a magazine is mounted during stuffing the molds, the method of selectively removing a magazine of molds from the closed loop at the discharge end of the lower run on demand and transferring the magazine to the stuffing station and reinserting a magazine of stuffed molds into the closed loop at the inlet end of the upper run, said method comprising the steps of: transferring an empty magazine of molds from the bottom elevator to the storage area of the stuffing station, transferring a magazine of stuffed molds from the stuffing platform to a top elevator, driving the top elevator to the upper run, and transferring a stuffed magazine from the top elevator to the upper run.

19. A method of removing a track supported wheeled unit from a closed loop of processing stations through which a plurality of units are being driven step-by-step at predetermined time intervals to a processing station outside the closed loop and of reinserting a unit into the closed loop from the outside processing station, said method including the steps of: transferring a unit from the closed loop to said outside processing station, transferring a unit from said outside processing station to an elevator means, driving said elevator means to a given point along the closed loop, and transferring the unit from said elevator means into said closed loop.

* * * * *

UNITED STATES PATENT AND TRADEMARK OFFICE
CERTIFICATE OF CORRECTION

PATENT NO. : 3,967,559

DATED : July 6, 1976

INVENTOR(S) : Charles H. Johnson and Edward A. Wallace

It is certified that error appears in the above-identified patent and that said Letters Patent are hereby corrected as shown below:

```
Col. 4, line 20, change "chnnels" to --channels--;
Col. 8, line 5,  change "31" to --131--; and
Col. 9, line 68, after "outside" insert --said--.
```

Signed and Sealed this

Fourth Day of January 1977

[SEAL]

Attest:

RUTH C. MASON
Attesting Officer

C. MARSHALL DANN
Commissioner of Patents and Trademarks